United States Patent Office 3,660,297
Patented May 2, 1972

3,660,297
LIQUID PAINT BOOTH DEFLOCCULANT
Thomas A. McCammon, Greenville, S.C., assignor to Morton-Norwich Products, Inc.
No Drawing. Filed Jan. 29, 1970, Ser. No. 6,951
Int. Cl. C11d 7/06, 7/12, 7/14
U.S. Cl. 252—156
4 Claims

ABSTRACT OF THE DISCLOSURE

A paint booth deflocculant wash solution utilizing electro-positive lithium ions to precipitate the paint.

---

In industrial spray painting operations the workpieces are usually sprayed inside a booth constructed to collect the excess paint droplets which do not adhere to the workpieces. A common method of collecting the droplets is the use of a waterfall background behind the workpiece into which the droplets travel or are drawn by forced air ventilation. The waterfall solution should have properties such that the paint droplets which enter it are rendered non-tacky so that they do not adhere to the surfaces of the wash system as the solution is passed through it. For purposes of conserving water and materials the solution should be recirculatable through the system without clogging the channels of flow. To accomplish this, the solution should be constituted so that the trapped paint becomes separated from the solution in an easily removable form.

The action of nearly all of the wash solutions is essentially as follows: (1) the oils in the paint are saponified in an alkaline solution and (2) the resultant soap is rendered insoluble by the reaction with suitable cations and depending upon the type of paint the insoluble material will either float or sink so that it does not recirculate and may be removed from the system. By some methods, both steps occur in the same system, so that the precipitated soaps remain in the reservoir and the liquor is recirculated. In other processes only the saponification is performed in the recirculating solution and when it becomes saturated, the solution is passed into a vat where the precipitation is effected; mere disposal of the paint-laden solution being ecologically offensive. Fresh solution is then added to the recirculating system. This second process is inferior to the first because of the extra equipment and steps required in segregating the saponification and precipitation processes. In either process the capacity of the solution is limited by the inherent insolubility of the commonly employed calcium and magnesium cations in an alkaline solution; it is necessary to replenish the cation concentration at frequent intervals and it is not possible to pre-mix the solutions of calcium and magnesium cations in concentrated form due to their low solubility.

By another process the oils in the trapped paint are absorbed by a colloid dispersed in the solution and the colloidal particles are kept in suspension by the use of a dispersing agent so that they do not adhere to the surfaces of the system during circulation. At a point where the solution is relatively quiescent, the oil laden colloids tend to separate out and may be collected.

Disadvantages of the previously mentioned methods are the frequency of replenishment of consumable materials and the impossibility of preparing concentrated solutions capable of being diluted into working solutions when needed. Either the solids must be dissolved at the time the working solution is prepared or the prepared solutions must be kept separate until diluted. Further, there is no known simple test to determine the remaining precipitating capacity of such wash solutions after an indeterminate period of use.

An object of my invention is to insure a plentiful supply of precipitating cations in the alkaline wash solutions so that frequent replenishment is not required. A further object is to provide a single pre-mixed concentrated solution to simplify handling of reagents and operations of the system. Yet another object is to provide a solution whose precipitating capacity can be easily determined at any time.

According to my invention the pH of the wash water used in spray paint booths is raised to a level at which saponification of the oils in the paint is effected, by the addition of sodium hydroxide, or other suitable alkali. Lithium hydroxide is added to give the desired concentration of precipitating cations. Lithium salts, unlike the conventionally used calcium or magnesium salts, are readily soluble in strongly alkaline solution, so that many times more precipitating cations may be in solution. The greatly increased cationic solubility allows the premixing of the solution in highly concentrated form so that handling, installation and replenishment are facilitated.

Since the precipitating capacity of the solution depends directly on the precipitating cation concentration, and not on complex ion or colloidal concentration, the capacity of the solution at a given time is easily determined by simple titration of the lithium cation.

Rives, U.S. Pat. No. 2,585,407, discloses the use of alkali metal hydroxides in spray paint booth wash solutions; however, the hydroxides are used to form a water-insoluble glue from starch and formaldehyde, not to effect deflocculation of the wash solution. Further, sodium or potassium salts are ineffective as precipitation cation contributors in my invention.

Schmid-Nisoli et al., U.S. Pat. No. 2,928,498, discloses the use of alkali metal salts of sulfonic acids in spray booth wash solutions to disperse the oil-laden colloidal particles, while in my invention the lithium salts are added to precipitate or agglomerate the saponified oils.

The following table illustrates formulations of my invention which have been found to be effective, the parts being by weight:

TABLE I

|  | I | II | III | IV | V | VI | VII | VIII | IX | X | XI |
|---|---|---|---|---|---|---|---|---|---|---|---|
| Water | 0 | 0 | 0 | 57 | 55 | 60 | 60 | 55 | 60 | 60 | 55 |
| Sodium hydroxide, 50% | 99 | 0 | 49.5 | 40 | 40 | 30 | 20 |  |  |  | 20 |
| Sidium silicate, 42° Bé | 0 | 99 | 49.5 |  |  |  |  | 40 | 30 | 20 | 20 |
| Lithium hydroxide, monohydrate | 1 | 1 | 1 | 3 | 5 | 10 | 20 | 5 | 10 | 20 | 5 |

Systems dealing with sodium meta or ortho silicates, sodium carbonates with lithium hydroxide have been found satisfactory. Systems dealing with potassium hydroxide and/or potassium salts in place of sodium have also been found satisfactory. Lithium chloride, lithium carbonate and other lithium salts may be used in place of lithium hydroxide in the formulation.

A preferred embodiment of my invention is as follows:

TABLE II

| | Percent |
|---|---|
| Water | 57.0 |
| Sodium hydroxide 50% | 40.0 |
| Lithium hydroxide monohydrate | 3.0 |

Other typical formulations which have great utility in various applications are:

TABLE III

|  | I | II | III | IV | V | VI |
|---|---|---|---|---|---|---|
| Water | 0 | 47 | 70 | 0 | 47 | 65 |
| Sodium hydroxide, 50% | 0 | 0 | 0 | 49.5 | 25 | 15 |
| Sodium silicate, 42° Bé. | 99 | 50 | 25 | 49.5 | 25 | 15 |
| Lithium hydroxide, monohydrate | 1 | 3 | 5 | 1.0 | 3 | 5 |

The using concentration of these various formulations depends upon (a) the paint used, and (b) the alkali metal formulation used, and considerable variation is permissible without rendering the solution ineffective. For use in the paint booth waterfall solution the formulas described in Tables I, II, and III are diluted with water in the ratio of a half ounce (fluid) per gallon. Some heavy paint applications such as enamels in a ratio up to ten ounces (fluid) per gallon is required for effective operation.

What is claimed is:

1. A concentrate adapted to be added to water in a water-wash paint spray booth consisting essentially of (A) from 15–99 parts by weight of an aqueous saponifying alkaline solution selected from the group consisting of 50% sodium hydroxide, 50% potassium hydroxide and sodium silicate 42° Bé.; (B) from one to twenty parts by weight of a member of the group consisting of lithium hydroxide monohydrate, lithium chloride, and lithium carbonate; and (C) the balance water.

2. A concentrate adapted to be added to water in a water-wash paint spray booth consisting essentially of:

| Ingredient: | Parts by weight |
|---|---|
| Water | 57 |
| Sodium hydroxide 50% | 40 |
| Lithium hydroxide monohydrate | 3 |

3. An aqueous solution for removal of oleoresinous paint droplets in spray paint booths consisting essentially of the concentrate of claim 1 and water in the ratio of one-half to ten fluid ounces of said concentrate per gallon of water.

4. An aqueous solution for removal of oleoresinous paint droplets in spray paint booths consisting essentially of the concentrate of claim 2 and water in the ratio of one-half to ten fluid ounces of said concentrate per gallon of water.

References Cited
UNITED STATES PATENTS

| 2,739,903 | 3/1956 | Arnold | 252—135 X |
| 2,982,723 | 5/1961 | Arnold et al. | 252—139 X |
| 3,173,879 | 3/1965 | Arnold et al. | 252—364 |
| 3,515,575 | 6/1970 | Arnold | 117—102 R |
| 3,389,085 | 6/1968 | Morway | 252—41 |
| 3,475,336 | 10/1969 | Cross | 252—41 |

OTHER REFERENCES

Ralston, A. W., Fatty Acids and Their Derivatives, John Wiley & Sons Inc., New York, 1948, pp. 281–87.

Weast et al., Handbook of Chemistry and Physics, The Chemical Rubber Co., Cleveland, Ohio, 1966, pp. B189, 190, D154.

HERBERT B. GUYNN, Primary Examiner

D. SILVERSTEIN, Assistant Examiner

U.S. Cl. X.R.

106—74; 117—102; 252—135